Patented Mar. 18, 1947

2,417,548

UNITED STATES PATENT OFFICE 2,417,548

PROCESS FOR PREPARING DIOXANES

Karl H. Engel, Teaneck, N. J., assignor to Allied Chemical & Dye Corporation, New York, N. Y., a corporation of New York No Drawing. Application February 23, 1943, Serial No. 476,847

9 Claims. (Cl. 260—338)

This invention relates to production of condensation products of formaldehyde with indene, styrene, coumarone or their homologs, and to processes for preparing the same.

Condensation of pure indene with formaldehyde in the presence of hydrochloric acid to obtain a drying oil has been disclosed by German Patent 310,783 of October 30, 1919. This drying oil, I have found, is constituted of a soft, resinous material resembling the resin formed by the polymerization of the polymerizable constituents, e. g. coumarone, indene or styrene, present in oils obtained from the fractional distillation of coal tar oils, drip oils and water-gas tar oils. This product has not, to the best of my knowledge, been employed extensively on a commercial scale.

An object of this invention is to provide a process for the production of condensation products of indene, coumarone, styrene or their homologs having characteristics such as to differentiate them substantially from the product of the type produced by the process of the German patent.

In accordance with this invention, useful condensation products are obtained by reacting an oil containing from about 10% to about 80% by weight of a substance selected from the group consisting of indene, styrene, coumarone and their homologs with an aqueous formaldehyde solution in the presence of a relatively small amount of a mineral acid. The preferred embodiment of this invention involves condensing an oil such as crude "Hi-flash" naphtha having a boiling range from about 176° to about 186° C. and containing from about 50% to about 70% by weight indene with an aqueous formaldehyde solution in the presence of relatively small amount of sulfuric acid. However, oils containing one of the above substances or mixtures thereof boiling from about 100° to about 210° C. may also be employed in the practice of this invention. The products of my invention are oils which boil at a temperature of about 90° to 100° C. higher than the boiling temperature of the unsaturated materials from which they are prepared; these oils are colorless when pure, do not oxidize or discolor on standing, nor tend to polymerize. They are excellent solvents for resins, gums and nitrocellulose and may be used as plasticizers in lacquers, synthetic resins and other plastics. It will be evident, therefore, they differ substantially in their physical properties from the soft, resinous material produced in accordance with the process of the German patent referred to above.

The products of my invention are also characterized by the presence of a 1,3-dioxane ring in their structure. Thus, for example, the compound prepared from indene may be represented by the formula

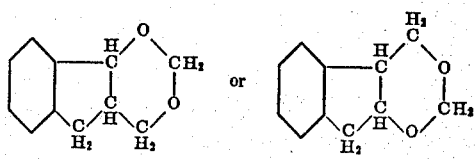

the product prepared from styrene has the formula:

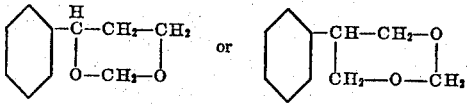

It will be noted these products are 1,3-dioxanes and, accordingly, the products above mentioned may properly and will hereinafter be termed "indenodioxane" and "phenyl dioxane" respectively.

In the practice of my invention it is important that the oil should contain between about 10% and about 80% by weight of indene, styrene, coumarone or their homologs since if the oil contains a greater proportion of such unsaturated materials, reactions with formaldehyde will not give the desired products but rather a resinous material similar to that obtained in the process of German Patent 310,783. Such oils may be obtained by diluting substantially pure indene, styrene, coumarone or homologs thereof with suitable diluents such as toluene; preferably, however, the oils to be treated in accordance with this invention are obtained from the fractional distillation of coal tar oils, drip oils, water-gas tar oils, or light oils removed by scrubbers in coal gas and water-gas operations, as these oils represent extremely cheap and readily available sources of the desired reactants. For example, crude carbolic oil "Hi-flash" naphtha, obtained in the refining of coal tar oils, boiling within the range of 100° to 210° C. and which may contain from about 20% to about 25% indene, 3% to 5% styrene, 5% to 8% methyl styrene and 1% to 5% coumarone by weight, is suitable for use in the practice of my invention; it will be evident that when using such an oil a mixture of dioxanes results. In accordance with the preferred embodiment of this invention, however, i. e. when preparing indenodioxane, I prefer to employ as a starting material a narrow fraction which may be obtained from carbolic oil "Hi-flash" naphtha boiling between about 176° and about 186° C. and containing between about 50% and about 70% indene, since such fraction not only contains a high concentration of indene and, hence, is suitable for use in accordance with the invention, but also by selecting this particular fraction the indene starting material is separated from higher boiling constituents of the carbolic oil "Hi-flash" naphtha, particularly naphthalene, which may have a boiling point close to that of the desired dioxane. However, if it is desired to prepare phenyl dioxane by reaction of styrene with formaldehyde, I prefer to employ as a starting material a fraction from crude "Hi-flash" naphtha boiling between about 120° and about 150° C.; a fraction boiling between about 150° and about 176° C. is suitable for the preparation of mixed methyl styrene-coumarone dioxanes.

The process of this invention may be carried out by mixing an oil of the above type containing indene, styrene, coumarone or their homologs or mixtures thereof, with an aqueous formaldehyde solution, preferably one containing between 30% and 37% formaldehyde by weight, and with a relatively small amount of a catalyst consisting of a mineral acid such as sulfuric or hydrochloric acids, and then heating the mixture, preferably under reflux, whereby reaction to form the desired dioxane takes place. The reaction mixture should preferably contain approximately 2 mols of formaldehyde per mol of the unsaturated reactant present in the oil employed, although additional formaldehyde does not interfere with the course of the reaction. Preferably, sulfuric acid is employed as the mineral acid since the use of this acid permits the employment of inexpensive lead-lined equipment, whereas the use of hydrochloric acid, for example, requires the employment of relatively expensive vessels which resist the action of this acid. Acids other than mineral acids should not be present. The amount of acid employed may vary widely, but preferably an amount of acid is employed such that the aqueous phase of the reaction mixture contains between 0.5 and 5 normal equivalents of mineral acid; amounts of acid such that the aqueous phase contains between 2 and 4 normal equivalents of acid are particularly suitable. The time of reaction may vary, depending upon the relative concentrations of reactants and the concentration of mineral acid. When operating in accordance with the preferred embodiment of this invention, i. e. when employing an oil containing from about 50% to 70% by weight of indene and a mineral acid concentration such that the aqueous phase of the reaction mixtures contains from 2 to 4 normal equivalents of acid, a time of reaction varying between five and eight hours is suitable; however, longer times of reaction, e. g. from eight to twenty hours, may be employed particularly if the concentration of indene, styrene, coumarone or their homologs is appreciably below 50%. Preferably, the reaction is carried out at refluxing temperature, although temperatures as low as 70° C. are suitable.

The dioxane product formed during the reaction separates as an oil from the reaction mixture in admixture with unreacted material and other hydrocarbon oils which may be present. This oil is preferably washed with water and then with dilute sodium hydroxide solution, and the washed product fractionated to separate the desired dioxane product from the residual material. The aqueous solution remaining may contain appreciable quantities of unreacted formaldehyde and may be again used in the practice of this invention if desired. By operating under the conditions above specified I have found that the primary product of the reaction is a dioxane or a mixture of dioxanes; this is indeed surprising in view of the fact prior investigators have invariably found that similar reactions led primarily to the formation of resins.

The physical properties of the dioxane obtained vary, depending upon whether they are derived from indene, styrene, coumarone or homologs thereof. Thus, for example, indenodioxane is a colorless oil and has a boiling point of about 134° C. at 10 mm. pressure, and a boiling point between 268° and 271° C. at atmospheric pressure; its refractive index ($n_D^{20}$) is 1.554 and its specific gravity at 15.5° C. as compared with water at the same temperature is 1.159. The product has a characteristic, somewhat fruit-like odor. Phenyl dioxane is a colorless oil having a boiling point of 115° to 117° C. at 8 mm. pressure, and 250° to 251° C. at atmospheric pressure; its refractive index ($n_D^{20}$) is 1.5309. The product has a characteristic odor resembling terpenes.

The following examples are illustrative. Amounts are given in parts by weight:

Example 1.—Carbolic oil "Hi-flash," from which tar acids and bases had been removed, was carefully fractionated and the fraction boiling between 176° and 186° C. recovered. This fraction had a specific gravity of 0.946 at 25° C. and contained approximately 63% indene. 473 parts of this oil were mixed with 300 parts of a 37% aqueous formaldehyde solution and 18 parts of concentrated hydrochloric acid and the mixture then refluxed with agitation for five hours. At the end of this time an oily layer had separated out on top of the reaction mixture. This oil was separated, washed with water, then with dilute caustic soda solution, and again with water. The washed oil was then fractionated under reduced pressure. After removal of the unreacted indene and other lower boiling oils, indenodioxane of a boiling range 134°–138° C. at 10 mm. pressure was recovered. Refractionation yielded a pure product boiling at 134° C. at 10 mm. pressure.

Example 2.—1440 parts of a crude carbolic oil "Hi-flash," from which tar acids and tar bases had been removed, were roughly distilled, and 950 parts of a fraction boiling from 150° to 200° C. were collected. This fraction contained approximately 290 parts of polymerizable hydrocarbons, of which approximately 200 parts were indene, the remainder consisting mainly of coumarone and methyl styrene. This fraction was mixed with 200 parts of a 37% aqueous formaldehyde solution and 15 parts of 50° Bé. sulfuric acid, and the mixture gently refluxed with agitation for twenty hours. At the end of this time the reaction mixture was permitted to settle. The oily layer collecting at the top of the mixture was separated from the aqueous layer, washed with water, then with dilute sodium hydroxide solution, and again with water, and the washed oil fractionally distilled under reduced pressure, whereby a mixture of dioxanes having a boiling range of 102°–125° C. at 5 mm. pressure was recovered; the bulk of the mixed dioxanes distilled within the boiling range of indenodioxane, i. e. 123°–125° C. at 5 mm.

Example 3.—200 parts of indene were mixed with 170 parts of toluene, 400 parts of a 37% aqueous formaldehyde solution, and 15 parts of 50° Bé. sulfuric acid and the mixture gently refluxed with agitation for five hours. At the end of this time the oily layer was permitted to separate from the reaction mixture and was removed, washed with a 10% solution of caustic soda and then with a small amount of water. The washed oil was then fractionated under reduced pressure. After removal of the toluene and unreacted indene, indenodioxane, having a boiling point of 122° C. at 5 mm. pressure, was recovered. The product was a water-white liquid, unaffected by exposure to light or air.

*Example 4.*—850 parts of a water-gas tar oil of boiling range 134°–160° C. and specific gravity at 20° C. of 0.875, containing approximately 25% of readily polymerizable material consisting mainly of styrene with smaller quantities of methyl styrenes, 400 parts of a 37% aqueous formaldehyde solution, and 60 parts of 35% hydrochloric acid were mixed and heated with gentle refluxing for five hours. At the end of this time the reaction mass was permitted to settle and the upper oil layer was separated, and washed with a dilute sodium hydroxide solution and water. Unreacted hydrocarbons were then removed from the oil by distillation at atmospheric pressure, until a vapor temperature of 170° C. had been reached. The remainder of the material was then distilled under a reduced pressure of 11 mm., the fraction boiling between 122° and 124° C. was recovered together with higher boiling material up to 135° C. The mixture of dioxanes thus obtained was light-colored, with a slightly yellowish tinge. Its refractive index ($n_D^{20}$) was 1.5296, and its specific gravity at 20° C. was 1.103.

*Example 5.*—180 parts of a water-gas tar oil, having a boiling range of 150°–178° C. and a specific gravity at 20° C. of 0.889, containing approximately 30% readily polymerizable materials, mainly a mixture of isomeric methyl styrenes, 100 parts of a 37% aqueous formaldehyde solution, and 35 parts of 35% hydrochloric acid were mixed and refluxed for five hours. The dioxanes were recovered from the reaction mixture as described in Example 4, distillation being conducted at 8 mm. pressure, whereby a product having a boiling range of 115° to 130° C., the bulk of which distilled in the range of 123°–127° C., was recovered. This product was slightly yellowish and had a terpene-like odor. Its refractive index ($n_D^{20}$) was 1.5318 and its specific gravity at 20° C. was 1.080.

*Example 6.*—312 parts of styrene were mixed with 250 parts of a saturated petroleum fraction having a boiling range of 85° to 135° C., 480 parts of a 37% aqueous solution of formaldehyde and 60 parts of 35% hydrochloric acid, and the mixture gently refluxed for twelve hours. At the end of this time the reaction mixture was permitted to settle. The upper oily layer was separated, washed with a 10% solution of sodium hydroxide and then with water. The washed oil was dried and fractionally distilled at atmospheric pressure to remove petroleum solvent and unconverted styrene. The residual oil, after collection of a small intermediate fraction, was distilled under a reduced pressure of 8 mm., whereby phenyl dioxane, distilling at a temperature of 115° to 117° C., was obtained.

Since certain changes may be made in carrying out the above process without departing from the scope of the invention, it is intended that all matter contained in the above description shall be interpreted as illustrative and not in a limiting sense. It is to be understood the term "formaldehyde" is used throughout the specification and claims in its customary sense to include not only the monomer but polymers of formaldehyde such as paraformaldehyde; the term "hydrocarbon oil" is used in the claims to include oils such as those recoverable from coal tar, water gas tar and drip oil and boiling within the range of 100° to 210° C., which are of a predominantly hydrocarbon nature, even though individual ingredients thereof, e. g. coumarone, may not strictly be considered hydrocarbons.

My co-pending application Serial No. 476,848, filed February 23, 1943, discloses production of indenodioxane, i. e. a compound having the structural formula

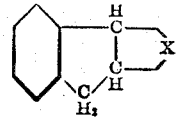

wherein X is the linkage —O—CH$_2$—O—CH$_2$—, by reacting an oil containing from 10 to 80% by weight of a substance selected from the group consisting of indene and its homologs with an aqueous formaldehyde solution in the presence of a mineral acid.

I claim:

1. A process for the preparation of dioxanes which comprises reacting a hydrocarbon oil boiling within the range of from about 100° to about 210° C. and containing between about 10% and about 80% by weight of a substance selected from the group consisting of indene, styrene, coumarone and their homologs with an aqueous formaldehyde solution in the presence of mineral acid, which is the sole acid ingredient.

2. A process for the preparation of dioxanes which comprises reacting a hydrocarbon oil boiling within the range of from about 100° to about 210° C. and containing between about 10% and about 80% by weight of a substance selected from the group consisting of indene, styrene, coumarone and their homologs with an aqueous solution containing between 30% and 37% by weight of formaldehyde in the presence of mineral acid, which is the sole acid ingredient.

3. A process for the preparation of dioxanes which comprises reacting a hydrocarbon oil boiling within the range of from about 100° to about 210° C. and containing between about 10% and about 80% by weight of a substance selected from the group consisting of indene, styrene, coumarone and their homologs with an aqueous solution containing between 30% and 37% by weight of formaldehyde in the presence of sulfuric acid, which is the sole acid ingredient.

4. A process for the preparation of dioxanes which comprises reacting a hydrocarbon oil boiling with the range of from about 100° to about 210° C. and containing between about 10% and about 80% by weight of a substance selected from the group consisting of indene, styrene, coumarone and their homologs with an aqueous solution containing between 30% and 37% by weight of formaldehyde in the presence of hydrochloric acid, which is the sole acid ingredient.

5. A process for the preparation of dioxanes which comprises reacting a hydrocarbon oil boiling within the range of from about 100° C. to about 210° C. and containing between about 10% and about 80% by weight of a substance selected from the group consisting of indene, styrene, coumarone and their homologs with an aqueous solution containing between about 30% and about 37% by weight of formaldehyde in the presence of mineral acid, which is the sole acid ingredient, the reaction mixture containing at least 2 mols of formaldehyde per mole of substances selected from the above group and the amount of acid being such that the aqueous phase of the reaction mixture contains between about 0.5 and about 5 equivalents of acid.

6. A process for the preparation of phenyl dioxane which comprises reacting a hydrocarbon oil boiling within the range of from about 100° C. to about 210° C. and containing between about 10% and about 80% styrene with an aqueous formaldehyde solution in the presence of mineral acid, which is the sole acid ingredient.

7. A process for the preparation of phenyl dioxane which comprises refluxing a hydrocarbon oil boiling within the range of from about 100° to about 210° C. and containing between about 10% and about 80% styrene with a solution containing between about 30% and about 37% formaldehyde in the presence of sulfuric acid, which is the sole acid ingredient.

8. A process for the preparation of a compound having the structural formula

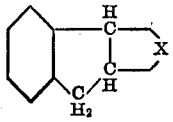

wherein X is the linkage —O—CH₂—O—CH₂—, which comprises reacting a hydrocarbon oil boiling within the range of from about 100° to about 210° C. and containing between about 10% and about 80% indene with an aqueous formaldehyde solution in the presence of a mineral acid and separating said compound from the reaction product.

9. A process for the preparation of a compound having the structural formula

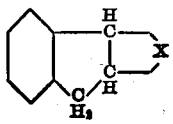

wherein X is the linkage —O—CH₂—O—CH₂—, which comprises refluxing a hydrocarbon oil boiling within the range of from about 100° to about 210° C. and containing between about 50% and about 70% indene with an aqueous solution containing between about 30% and about 37% formaldehyde in the presence of sulfuric acid, separating an oily layer from the reaction mass, and fractionally distilling this oily layer to recover said compound therefrom.

KARL H. ENGEL.

REFERENCES CITED

The following references are of record in the file of this patent:

UNITED STATES PATENTS

| Number | Name | Date |
|---|---|---|
| 2,325,760 | Fitzky | Aug. 3, 1943 |
| 2,035,123 | Fulton | Mar. 24, 1936 |
| 2,241,777 | Friedricksen | May 13, 1941 |
| 2,362,307 | Ritter | Nov. 7, 1944 |
| 2,296,375 | Arundale | Sept. 22, 1942 |
| 2,289,548 | Loder | July 14, 1942 |
| 2,356,683 | Mikeska | Aug. 22, 1944 |
| 2,312,743 | Arundale | Mar. 2, 1943 |

FOREIGN PATENTS

| Number | Country | Date |
|---|---|---|
| 310,783 | German | Oct. 30, 1919 |

OTHER REFERENCES

Prins (Boeseken), Amsterdam, K. Akad. v. Wetenischapen, Proceeding Sect. Science, vol. 22 (1919), pp. 51–54 (Library of Congress). Photostat copy in 260–338.8, Div. 59.

Ellis, Chemistry of Synthetic Resins, vol. 1, Reinhold Pub. Co. 1935, pages 92, 99, 256. (Copy in Division 50.)